United States Patent
Driscoll

(10) Patent No.: US 7,277,543 B1
(45) Date of Patent: Oct. 2, 2007

(54) CRYPTOGRAPHIC COMBINER USING TWO SEQUENTIAL NON-ASSOCIATIVE OPERATIONS

(75) Inventor: Kevin R. Driscoll, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 1165 days.

(21) Appl. No.: 09/712,505

(22) Filed: Nov. 14, 2000

(51) Int. Cl.
*H04L 9/00* (2006.01)
*H04K 1/00* (2006.01)
*G06F 15/173* (2006.01)

(52) U.S. Cl. .................. 380/43; 380/262; 380/265; 380/268; 713/194

(58) Field of Classification Search ............ 380/42–44, 380/46–47, 262, 265, 268; 713/182, 194, 713/200–201, 169–170; 709/223–229
See application file for complete search history.

(56) References Cited

U.S. PATENT DOCUMENTS

| | | | | |
|---|---|---|---|---|
| 4,078,152 A | * | 3/1978 | Tuckerman, III | ............ 380/37 |
| 4,979,832 A | * | 12/1990 | Ritter | ........................... 380/28 |
| 5,195,136 A | * | 3/1993 | Hardy et al. | ................... 380/43 |
| 5,307,409 A | | 4/1994 | Driscoll | ........................... 380/2 |
| 5,341,425 A | * | 8/1994 | Wasilewski et al. | ........ 380/212 |
| 5,703,952 A | * | 12/1997 | Taylor | ........................... 380/44 |
| 5,717,760 A | | 2/1998 | Satterfield | |
| 5,943,248 A | * | 8/1999 | Clapp | ........................ 708/270 |
| 6,014,445 A | | 1/2000 | Kohda | |
| 6,026,490 A | * | 2/2000 | Johns-Vano et al. | ........ 713/200 |
| 6,182,216 B1 | * | 1/2001 | Luyster | ....................... 713/168 |
| 6,185,679 B1 | * | 2/2001 | Coppersmith et al. | ...... 713/150 |
| 6,404,888 B1 | * | 6/2002 | Barbir | ........................ 380/22 |
| 6,560,338 B1 | * | 5/2003 | Rose et al. | .................... 380/47 |
| 6,731,758 B1 | * | 5/2004 | Graunke et al. | ............. 380/239 |
| 6,751,319 B2 | * | 6/2004 | Luyster | ....................... 380/37 |
| 6,760,440 B1 | * | 7/2004 | Driscoll | ....................... 380/37 |
| 6,763,363 B1 | * | 7/2004 | Driscoll | ....................... 708/252 |

FOREIGN PATENT DOCUMENTS

EP     1063811 A     12/2000

OTHER PUBLICATIONS

Zeng, Kencheng et al., "Pseudorandom Bit Generators in Stream-Cipher Cryptography," IEEE Computer, pp. 8-17, (Feb. 1991).

* cited by examiner

*Primary Examiner*—Gilberto Barron, Jr.
*Assistant Examiner*—Jenise Jackson
(74) *Attorney, Agent, or Firm*—Kris T. Fredrick

(57) ABSTRACT

A stream cipher cryptosystem includes a keystream generator receiving a key and providing a keystream. A cryptographic combiner combines a first binary data sequence and the keystream with two non-associative operations to provide a second binary data sequence. In encryption operations, the cryptographic combiner is an encryption combiner and the first binary data sequence is a plaintext binary data sequence and the second binary data sequence is a ciphertext binary data sequence. In decryption operations, the cryptographic combiner is a decryption combiner and the first binary data sequence is a ciphertext binary data sequence and the second binary data sequence is a plaintext binary data sequence.

43 Claims, 2 Drawing Sheets

CRYPTOGRAPHIC COMBINER USING TWO SEQUENTIAL NON-ASSOCIATIVE OPERATIONS

THE FIELD OF THE INVENTION

The present invention generally relates to cryptosystems, and more particularly relates to private-key stream cipher cryptosystems which combine a keystream with plaintext to encrypt the plaintext into ciphertext and combine the ciphertext with a keystream to decipher the ciphertext into plaintext.

BACKGROUND OF THE INVENTION

Cryptosystems perform cryptography to transform plaintext into ciphertext so that only an authorized receiver can transform the ciphertext back into the original plaintext. Encryption or enciphering is the process that transforms plaintext into ciphertext. Decryption or deciphering is the process that transforms ciphertext into plaintext.

A parameter called an encryption key is employed by a cryptosystem to prevent the plaintext from being easily revealed by an unauthorized person. A sender transforms a given plaintext into one of a large variety of possible ciphertexts selected by the specific encryption key. A receiver of the ciphertext deciphers the ciphertext by employing a parameter referred to as a decryption key. In a public-key cryptosystem, the encryption key is made public while the decryption key is kept secret. Therefore, in public key cryptosystems, the decryption key must be computationally infeasible to deduce from the encryption key. In a private-key cryptosystem, the sender and the receiver typically share a common key that is used for both enciphering and deciphering. In such a private-key cryptosystem, the common key is alterable and must be kept secret.

Private-key cryptosystems are typically implemented as block cipher cryptosystems or stream cipher cryptosystems. Block cipher cryptosystems divide the plaintext into blocks and encipher each block independently using a stateless transform. In block cipher cryptosystems, if one fixed common private-key is employed to encipher different occurrences of a particular plaintext block, all of these occurrences are encrypted into identical corresponding ciphertext blocks. Therefore, the block size is preferably selected to be large enough to frustrate attacks from a cryptanalyst, which analyzes the occurrence frequencies of various patterns among the ciphertext blocks. Example block sizes are 64 bits and 128 bits.

In stream cipher cryptosystems, the plaintext is typically encrypted on a bit-by-bit or word-by-word basis using a stateful transform that evolves as the encryption progresses. In encrypting the plaintext binary data sequence for transmission as a ciphertext binary data sequence, the common private-key is a parameter that typically controls a pseudo-random number generator to create a long sequence of binary data referred to as a keystream. The stream cipher cryptosystem includes a cryptographic combiner, which combines the keystream with the plaintext sequence. The cryptographic combiner is typically implemented with exclusive-or (XOR) bit-wise logic gates, which perform bit-wise modulo-2 addition. The cryptographic combiner produces the ciphertext. At the receiver, the common private-key controls a receiver pseudo-random number generator to produce a decryption keystream. The decryption keystream is combined with a decryption combiner to decrypt the ciphertext to provide the plaintext to the receiver.

One problem with stream cipher cryptosystems is the difficulty of generating a long, statistically uniform, and unpredictable sequence of binary data in the keystream from a short and random key. Such sequences are desirable in the keystream in cryptography to make it impossible, given a reasonable segment of its data and sufficient computer resources, to find out more about the sequences. Because of the difficulty in producing sequences that are completely unpredictable, it is desirable to have a combiner that reveals as little as possible about the keystream to an adversary having knowledge of the plaintext corresponding to some ciphertext (a so called "known plaintext attack").

There are four general requirements for cryptographically secure keystream pseudo-random number generators. First, the period of a keystream must be large enough to accommodate the length of the transmitted message. Second, the keystream output bits must have good statistical properties (e.g. values are uniformly distributed). Third, the keystream output bits must be easy to generate. Fourth, the keystream output bits must be hard to predict. For example, given the pseudo-random number generator and the first N output bits, $a(0), a(1), \ldots, a(N-1)$, it should be computationally infeasible to predict the $(N+1)^{th}$ bit $a(N)$ in a sequence with better than a 50-50 chance. In otherwords, a cryptanalyst should not be able to generate other forward bits or backward bits if presented with a given portion of the keystream output sequence.

The receiver decryption combiner operation must be the inverse of the sender encryption combiner. The most common combiner operation is bit-wise XOR. One problem with the XOR combiner operation is that, if some or all of the plaintext of a message is known, the known plaintext can be combined with the associated ciphertext to reveal all or part of the keystream. This could enable one to read other messages sent under the same key, or to forge ciphertext messages that will decrypt to whatever plaintext is desired by an adversary. A second problem with the XOR combiner operation is that an accidental double encryption causes all of the plaintext to become visible. Another problem with the XOR combiner operation is that two ciphertexts using the same key can be XORed together by a cryptanalyst to eliminate the keystream and leave the XOR of two plaintexts. The low entropy of languages, such as the English language, allows for the XOR of two plaintexts to be resolved into its two original plaintext messages. Furthermore, if the keystream period is smaller than a message, this type of cryptanalysis also can be performed by dividing a ciphertext message into portions the size of the keystream and XORing the portions together to eliminate the keystream and leave the XOR of the plaintext portions.

Another problem with the XOR combiner operation is that it allows an adversary to manipulate the contents of the message with only trivial information about its structure. If an adversary wants to change some bit(s) in the received plaintext, all that need be done is to intercept the ciphertext message, invert the ciphertext bit(s) corresponding to the plaintext bit(s) the adversary wants to change, and then send the message on to the receiver. The only knowledge that an adversary needs is the location within the message of the bit(s) to be changed.

Similar problems as those discussed above exist in all linear combiners, although typically not as severe as in an XOR combiner. Some very complex cryptographic combiners solve some of the above-problems. These very complex cryptographic combiners are, however, quite expensive in terms of time and/or hardware resources. One example cryptographic combiner in this very complex category is a permutation table combiner. The permutation table is required to have a table the size of the plaintext alphabet. For example, if the plaintext unit size is 32 bits, the permutation table needs to be 16 gigabytes. On the other hand, if the plaintext unit size is 8 bits, the permutation table size is only required to be 256 bytes, but encrypting 8 bit plaintext units is typically 4 times slower than using 32 bit plaintext units. In addition, the smaller plaintext unit size limits the amount of plaintext diffusion. Plaintext diffusion means that plaintext bits can affect the encryption of other plaintext bits. Diffusion is desirable because it makes cryptanalysis more difficult. The XOR combiner operation has no plaintext diffusion.

For reasons stated above and for other reasons presented in greater detail in the Description of the Preferred Embodiments section of the present specification, a cryptographic combiner is desired for stream cipher cryptosystems wherein known plaintext can not be combined with associated ciphertext to reveal the keystream, and wherein accidental double encryption does not remove the keystream from the combined output bits. In addition, there is a need for a cryptographic combiner where the same keystream cannot be used to combine two ciphertext to eliminate the keystream and leave the combiner operation of the two original plaintext messages. Such a desired cryptographic combiner should be relatively inexpensive in time and hardware resources.

SUMMARY OF THE INVENTION

The present invention provides a stream cipher cryptosystem including a keystream generator receiving a key and providing a keystream. The stream cipher cryptosystem also includes a cryptographic combiner receiving a first binary data sequence and the keystream. The cryptographic combiner performs two sequential non-associative operations on the first binary data sequence and the keystream to provide a second binary data sequence.

In encryption operations, the cryptographic combiner is an encryption combiner and the first binary data sequence is a plaintext binary data sequence and the second binary data sequence is a ciphertext binary data sequence. In decryption operations, the cryptographic combiner is a decryption combiner and the first binary data sequence is a ciphertext binary data sequence and the second binary data sequence is a plaintext binary data sequence.

In one embodiment, the two sequential non-associative operations are integer addition and XOR. In another embodiment, the two sequential non-=§associative operations are integer subtraction and XOR. Other embodiments employ other non-associative operations, including modular multiplication and XOR, inverse modular multiplication and XOR, rotate right and XOR, and rotate left and XOR.

In one form of the present invention, a stream cipher cryptosystem includes an encryption pseudo-random number generator receiving a key and providing an encryption keystream. An encryption combiner receives a first plaintext binary data sequence and the encryption keystream. The encryption combiner performs a first set of two non-associative operations on the first plaintext binary data sequence and the encryption keystream to provide a ciphertext binary data sequence. A decryption pseudo-random number generator receives the key and provides a decryption keystream. A decryption combiner receives the ciphertext binary data sequence and the decryption keystream. The decryption combiner performs a second set of two non-associative operations on the ciphertext binary data sequence and the decryption keystream to provide a second plaintext binary data sequence substantially similar to the first plaintext binary data sequence. In this form of the present invention, each operation in the second set is the inverse of an operation in the first set and the operations in the second set are performed in the reverse order of the operation in the first set.

The stream cipher cryptosystem according to the present invention includes a cryptographic combiner using two sequential non-associative operations wherein known plaintext can not be combined with associated ciphertext to reveal the keystream, and wherein accidental double encryption does not remove the keystream from the combined output bits. In the cryptographic combiner operation according to the present invention, combining two ciphertexts does not eliminate the keystream and leave a combination of the two original plaintext messages. Nevertheless, the cryptographic combiner operation according to the present invention requires a minimal increase of resources over conventional XOR and other linear combiner operations.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
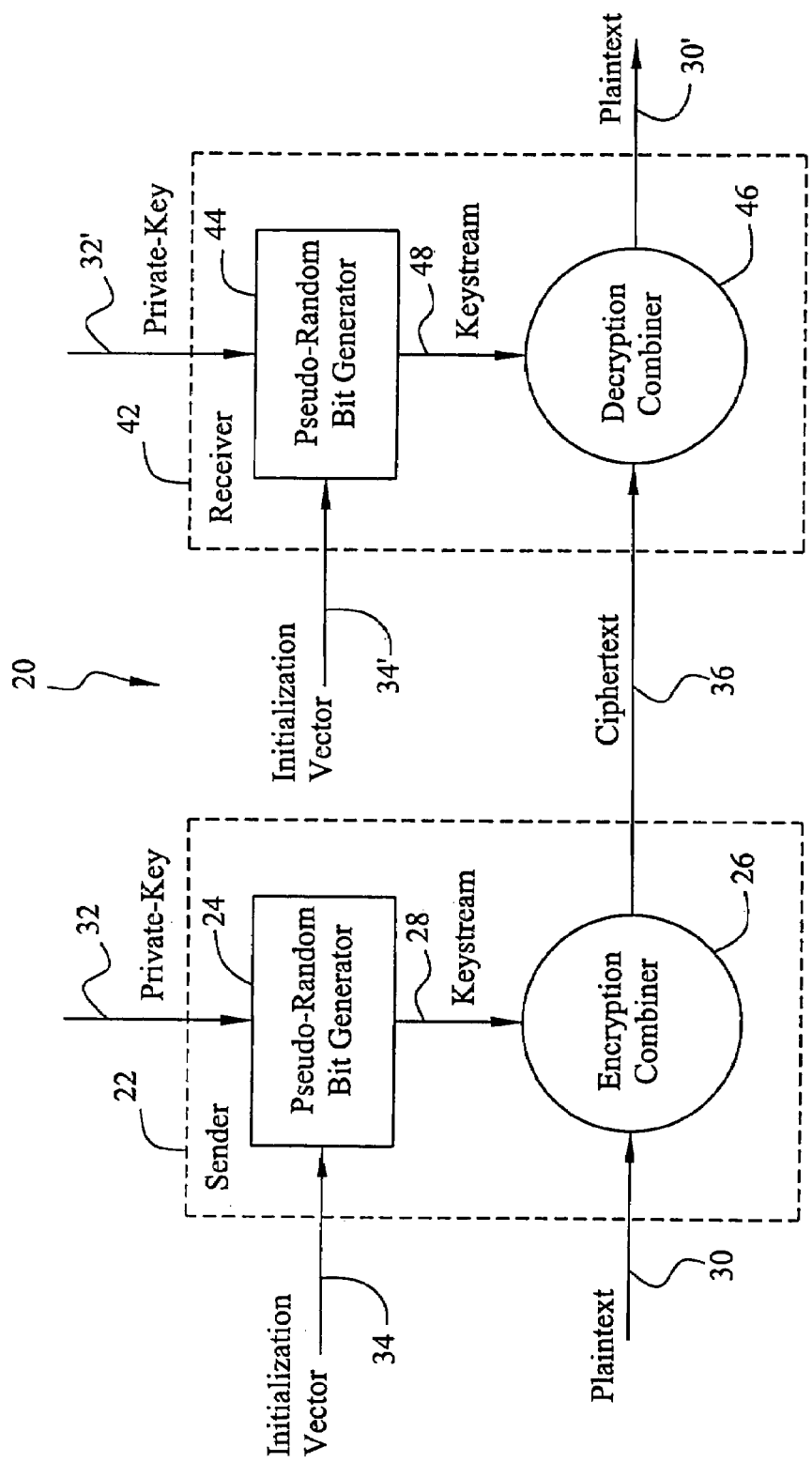
FIG. 1 is a block diagram of a cryptosystem according to the present invention.

A private-key stream cipher cryptosystem according to the present invention is illustrated generally at 20 in FIG. 1 in block diagram form. Stream cipher cryptosystem 20 includes a sender 22, such as a computer system, and a receiver 42, such as a computer system.

Sender 22 includes a pseudo-random number generator 24 and an encryption combiner 26. Pseudo-random number generator 24 receives a private-key 32, which controls pseudo-random number generator 24 to produce an encryption keystream 28 to be provided to encryption combiner 26. In the embodiment illustrated in FIG. 1, an initialization vector 34 is also provided to pseudo-random number generator 24 to ensure that encryption keystream 28 is not the same even if the same private-key 32 is used to control pseudo-random number generator 24 for multiple messages. Initialization vector 34 can be embodied as a sequence number to ensure that every message that is encrypted is slightly different.

Plaintext 30 is also provided to encryption combiner 26. Plaintext 30 is a binary data sequence. Encryption combiner 26 combines plaintext 30 and encryption keystream 28 to form ciphertext 36, which is also a binary data sequence.

Receiver 42 includes pseudo-random number generator 44 and decryption combiner 46. Pseudo-random number generator 44 receives private-key 32', which is the same private-key as the private-key 32. Pseudo-random number generator 44 is controlled by private-key 32' to produce keystream 48, which is provided to decryption combiner 46. In the embodiment illustrated in FIG. 1, an initialization vector 34', which is the same initialization vector as initialization vector 34, is provided to pseudo-random number generator 44 to ensure that decryption keystream 48 is identical to encryption keystream 28 for a given private key 32/32' and initialization vector 34/34'.

Decryption combiner 46 receives ciphertext 36 and combines ciphertext 36 with decryption keystream 48 to produce plaintext 30', which is a binary data sequence that substantially matches plaintext 30.

There are many known pseudo-random number generators that are suitable for pseudo-random number generator 24 and pseudo-random number generator 44. As mentioned in the Background of the Invention section of the present specification, pseudo-random number generators 24 and 44 should have the following general characteristics to produce cryptographically secure keystreams 28 and 48. First, the period of a keystream must be large enough to accommodate the length of the transmitted message. Second, the keystream output bits must be easy to generate. Third, the keystream output bits must be hard to predict.

Figure 2:
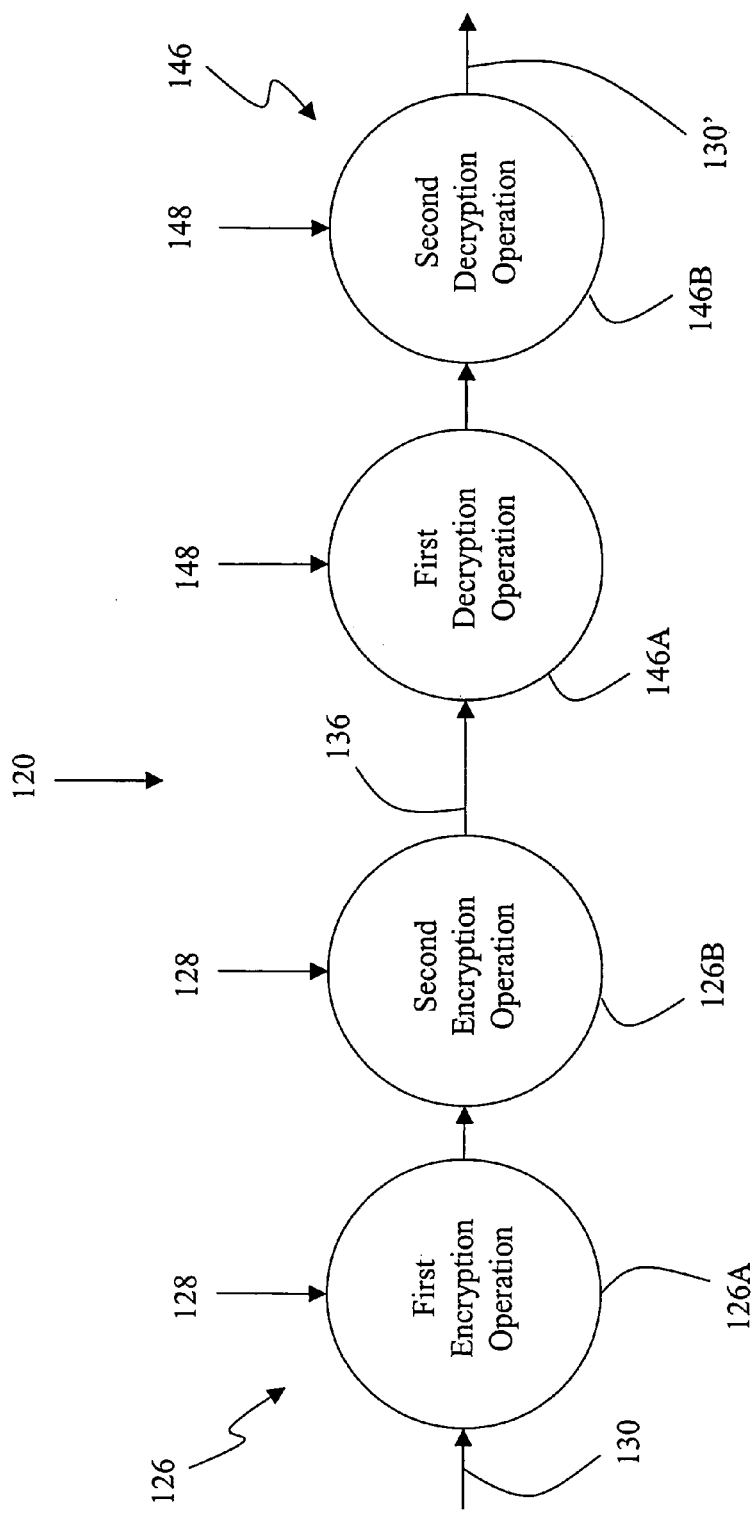
FIG. 2 is one embodiment of a cryptosystem's combiners according to the present invention.

One embodiment of a portion of a cryptosystem according to the present invention is illustrated generally at 120 in FIG. 2. Cryptosystem 120 includes a pair of cryptographic combiners 126 and 146, each configured to perform two sequential non-associative operations. Combiner 126 performs first encryption operation 126A and then second encryption operation 126B. Combiner 146 performs first decryption operation 146A and then second decryption operation 146B. In one embodiment, encryption combiner 126 performs an integer addition operation, which is represented by second encryption operation 126B, and an XOR operation, which is represented by first encryption operation 126A. Correspondingly, in this embodiment, decryption combiner 146 performs an XOR operation, which is represented by second decryption operation 146B, and an integer subtraction operation, which is represented by first decryption operation 146A. The integer subtraction operation is an inverse of the integer addition operation, and the XOR operation is its own inverse. The encryption operation performed by one embodiment of combiner 126 is represented mathematically by the following Equation I:

$$c = (p \wedge k1) + k2 \qquad \text{Equation I}$$

wherein:
c represents a unit of ciphertext, such as ciphertext 136;
p represents a unit of plaintext, such as plaintext 130;
$\wedge$ represents an XOR operation;
k1 represents a first unit of an encryption keystream, such as encryption keystream 128; and
k2 represents a second unit of the encryption keystream, such as encryption keystream 128.

As indicated by Equation I, one embodiment of combiner 126 first performs an XOR operation on plaintext 130 and a first unit (k1) of encryption keystream 128, and then adds the result with a second unit (k2) of encryption keystream 128 to produce ciphertext 136. Alternatively, in one embodiment combiner 126 performs the integer addition operation first, followed by the XOR operation, to produce ciphertext 136.

The operations in the above encryption Equation I are non-associative, such that $(p \wedge k1) + k2 \neq p \wedge (k1 + k2)$.

The decryption operation performed by one embodiment of combiner 146 is represented mathematically by the following Equation II:

$$p = (c - k2) \wedge k1 \qquad \text{Equation II}$$

wherein:
p represents a unit of plaintext, such as plaintext 130';
c represents a unit of ciphertext, such as ciphertext 136;
$\wedge$ represents an XOR operation;
k1 represents a first unit of a decryption keystream, such as decryption keystream 148; and
k2 represents a second unit of the decryption keystream, such as decryption keystream 148.

As indicated by Equation II, one embodiment of combiner 146 first subtracts a second unit (k2) of decryption keystream 148 from ciphertext 136, and performs an XOR operation on the result and a first unit (k1) of decryption keystream 148 to produce plaintext 130'. Alternatively, if combiner 126 is implemented in an embodiment that performs the integer addition operation first, followed by the XOR operation, combiner 146 is correspondingly implemented in an embodiment that performs the XOR operation first, followed by the integer subtraction operation.

The operations in the above decryption Equation II are non-associative, such that $(c - k2) \wedge k1 \neq c - (k2 \wedge k1)$.

Decryption keystream 148 is identical to keystream 128. Plaintext 130' is substantially similar to plaintext 130.

In an alternative embodiment of a portion of a cryptosystem according to the present invention, encryption combiner 126 performs an integer subtraction operation, represented by second encryption operation 126B, and an XOR operation, represented by first encryption operation 126A. Correspondingly, in this embodiment, decryption combiner 146 performs an integer addition operation, represented by first decryption operation 146A, and an XOR operation, represented by second decryption operation 146B.

The encryption operation performed by one embodiment of combiner 126 is represented mathematically by the following Equation III:

$$c = (p \wedge k1) - k2 \qquad \text{Equation III}$$

wherein:
c represents a unit of ciphertext, such as ciphertext 136;
p represents a unit of plaintext, such as plaintext 130;
$\wedge$ represents an XOR operation;
k1 represents a first unit of an encryption keystream, such as encryption keystream 128; and
k2 represents a second unit of the encryption keystream, such as encryption keystream 128.

As indicated by Equation III, one embodiment of combiner 126 first performs an XOR operation on plaintext 130 and a first unit (k1) of encryption keystream 128, and then a second unit (k2) of encryption keystream 128 is subtracted from the result of the XOR operation to produce ciphertext 136. Alternatively, one embodiment of combiner 126 performs the integer subtraction operation first, followed by the XOR operation, to produce ciphertext 136.

The operations in the above encryption Equation III are non-associative, such that $(p \wedge k1) - k2 \neq p \wedge (k1 - k2)$.

The decryption operation performed by one embodiment of combiner 146 is represented mathematically by the following Equation IV:

$$p = (c + k2) \wedge k1 \qquad \text{Equation IV}$$

wherein:
p represents a unit of plaintext, such as plaintext 130';
c represents a unit of ciphertext, such as ciphertext 136;
$\wedge$ represents an XOR operation;
k1 represents a first unit of a decryption keystream, such as decryption keystream 148; and k2 represents a second unit of the decryption keystream, such as decryption keystream 148.

As indicated by Equation IV, one embodiment of combiner 146 first adds a second unit (k2) of decryption keystream 148 to ciphertext 136, and performs an XOR operation on the result of the addition operation and the first unit (k1) of decryption keystream 148 to produce plaintext 130'. Alternatively, if combiner 126 is implemented in an embodiment that performs the integer subtraction operation first, followed by the XOR operation, combiner 146 is correspondingly implemented in an embodiment that performs the XOR operation first, followed by the integer addition operation.

The operations in the above decryption Equation IV are non-associative, such that $(c+k2)\hat{\ }k1 \neq c+(k2\hat{\ }k1)$.

Decryption keystream 148 is identical to keystream 128. Plaintext 130' is substantially similar to plaintext 130.

With one of the operations performed by combiner 126, such as the integer addition operation or the integer subtraction operation, involving carry or borrow into succeedingly more significant bits, plaintext diffusion is provided. It is desired to have a carry or borrow possible for each bit position, because the carry or borrow produces diffusion among the plaintext bits. Plaintext diffusion means that plaintext bits can affect the encryption of other plaintext bits.

In addition to the non-associative operations discussed above (e.g., integer addition and XOR, and integer subtraction and XOR), other non-associative operations can be used in the combiner operation of the present invention. For example, modular multiplication and XOR can be used. As another example, either a rotate left (a specified number of bits) or a rotate right (a specified number of bits) operation can be used in conjunction with an XOR operation. The inverse of these operations is then used for decryption.

It should be noted that the above-block diagram of FIG. 2 is for illustrative purposes only and that the combiner according to the present invention can be implemented in either hardware or software.

A cryptosystem according to the present invention, such as cryptosystems 20 and 120, employs cryptographic combiners that overcome problems with XOR and other linear combiners as discussed in the Background of the Invention section of the present specification. For example, known plaintext cannot be combined with associated ciphertext to reveal the keystream, and accidental double encryption does not remove the keystream. A complete message cannot be forged, and only the most significant bit of each encrypted unit is vulnerable. Similarly, adding multiple identically keyed messages together with the combiner operation according to the present invention does not remove a substantial amount of key, only the least significant bit of each encrypted unit is revealed. Since each combiner operation according to the present invention is substantially the same complexity as the XOR and other linear combiner operations, there is not the extensive expense in time, hardware and/or software resources of conventional very complex combiner operations.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the mechanical, electro-mechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A system comprising:
   a source for receiving a key and providing a keystream in a stream cipher cryptosystem; and
   a cryptographic combiner receiving a first binary data sequence and the keystream and performing two sequential non-associative operations on the first binary data sequence and the keystream to provide a second binary data sequence.

2. The system of claim 1 wherein the cryptographic combiner is an encryption combiner and the first binary data sequence is a plaintext binary data sequence and the second binary data sequence is a ciphertext binary data sequence.

3. The system of claim 1 wherein the cryptographic combiner is a decryption combiner and the first binary data sequence is a ciphertext binary data sequence and the second binary data sequence is a plaintext binary data sequence.

4. The system of claim 1 wherein the two sequential non-associative operation are an integer addition operation and an XOR operation.

5. The system of claim 1 wherein the two sequential non-associative operations are an integer subtraction operation and an XOR operation.

6. The system of claim 1 wherein the two sequential non-associative operations are a modular multiplication operation and an XOR operation.

7. The system of claim 1 wherein the two sequential non-associative operations are an inverse modular multiplication operation and an XOR operation.

8. The system of claim 1 wherein the two sequential non-associative operations are a rotate right operation and an XOR operation.

9. The system of claim 1 wherein the two sequential non-associative operations are a rotate left operation and an XOR operation.

10. A system comprising:
    a source for providing an encryption keystream in a stream cipher cryptosystem;
    an encryption combiner receiving a first plaintext binary data sequence and the encryption keystream and performing a first set of two non-associative operations on the first plaintext binary data sequence and the encryption keystream to provide a ciphertext binary data sequence;
    a source for providing a decryption keystream; and
    a decryption combiner receiving the ciphertext binary data sequence and the decryption keystream and performing a second set of two non-associative operations on the ciphertext binary data sequence and the decryption keystream to provide a second plaintext binary data sequence identical to the first plaintext binary data sequence.

11. The system of claim 10 wherein each operation in the second set is the inverse of an operation in the first set.

12. The system of claim 10 wherein the operations in the first set include an integer addition operation and an XOR operation, and the operations in the second set include an integer subtraction operation and an XOR operation.

13. The system of claim 10 wherein the operations in the first set include an integer subtraction operation and an XOR operation, and the operations in the second set include an integer addition operation and an XOR operation.

14. The system of claim 10 wherein the operations in the first set include a modular multiplication operation and an XOR operation, and the operations in the second set include an inverse modular multiplication operation and an XOR operation.

15. The system of claim 10 wherein the operations in the first set include an inverse modular multiplication operation and an XOR operation, and the operations in the second set include a modular multiplication operation and an XOR operation.

16. The system of claim 10 wherein the operations in the first set include a rotate right operation and an XOR operation, and the operations in the second set include a rotate left operation and an XOR operation.

17. The system of claim 10 wherein the operations in the first set include a rotate left operation and an XOR operation, and the operations in the second set include a rotate right operation and an XOR operation.

18. A method of encrypting a plaintext binary data sequence, the method comprising the steps of:
generating an encryption keystream as a function of a key in a stream cipher cryptosystem; and
combining the plaintext binary data sequence and the encryption keystream with two non-associative operations to provide a ciphertext binary data sequence.

19. The method of claim 18 wherein the two non-associative operations include an integer addition operation.

20. The method of claim 19 wherein the two non-associative operations include an XOR operation.

21. The method of claim 18 wherein the two non-associative operations include an integer subtraction operation.

22. The method of claim 21 wherein the two non-associative operations include an XOR operation.

23. The method of claim 18 wherein the two non-associative operations include a modular multiplication operation.

24. The method of claim 23 wherein the two non-associative operations include an XOR operation.

25. The method of claim 18 wherein the two non-associative operations include an inverse modular multiplication operation.

26. The method of claim 25 wherein the two non-associative operations include an XOR operation.

27. The method of claim 18 wherein the two non-associative operations include a rotate right operation.

28. The method of claim 27 wherein the two non-associative operations include an XOR operation.

29. The method of claim 18 wherein the two non-associative operations include a rotate left operation.

30. The method of claim 29 wherein the two non-associative operations include an XOR operation.

31. A method of decrypting a ciphertext binary data sequence, the method comprising the steps of:
generating a decryption keystream as a function of a key in a stream cipher cryptosystem; and
combining the ciphertext binary data sequence and the decryption keystream with two non-associative operations to provide a plaintext binary data sequence.

32. The method of claim 31 wherein the two non-associative operations include an integer addition operation.

33. The method of claim 32 wherein the two non-associative operations include an XOR operation.

34. The method of claim 31 wherein the two non-associative operations include an integer subtraction operation.

35. The method of claim 34 wherein the two non-associative operations include an XOR operation.

36. The method of claim 31 wherein the two non-associative operations include a modular multiplication operation.

37. The method of claim 36 wherein the two non-associative operations include an XOR operation.

38. The method of claim 31 wherein the two non-associative operations include an inverse modular multiplication operation.

39. The method of claim 38 wherein the two non-associative operations include an XOR operation.

40. The method of claim 31 wherein the two non-associative operations include a rotate right operation.

41. The method of claim 40 wherein the two non-associative operations include an XOR operation.

42. The method of claim 31 wherein the two non-associative operations include a rotate left operation.

43. The method of claim 42 wherein the two non-associative operations include an XOR operation.

* * * * *